United States Patent [19]
Dombro

[11] 3,864,420
[45] Feb. 4, 1975

[54] ALPHA OLEFIN SEPARATION PROCESS
[75] Inventor: Robert A. Dombro, Arlington Heights, Ill.
[73] Assignee: Universal Oil Products Company, Des Plaines, Ill.
[22] Filed: May 2, 1974
[21] Appl. No.: 466,387

[52] U.S. Cl. ........ 260/677 A, 260/609 B, 260/683.2
[51] Int. Cl. ............................................. C07c 11/02
[58] Field of Search ......... 260/677 A, 609 B, 609 F, 683.2

[56] References Cited
UNITED STATES PATENTS
2,035,449  3/1936  Archibald et al. ............... 260/683.2
2,395,274  2/1946  Hillyer et al. ..................... 26/683.2
3,071,625  1/1963  Kulik et al. ........................ 260/609
3,312,751  4/1967  Kerr et al. ........................ 260/677 R
3,542,891  11/1970 Schmerlin ....................... 260/677 R
3,558,733  7/1969  Myers ............................. 260/683.2

OTHER PUBLICATIONS
"Organic Chemistry of Bivalent Sulfur," Reid et al., pps. 30–32, Vol. I.
"Journal of the American Chemical Society," Vol. 60 pp. 2452–2455 (1938).
"Chemical Review," 1942, Vol. 27, pps. 388–394.

Primary Examiner—Delbert E. Gantz
Assistant Examiner—Juanita M. Nelson
Attorney, Agent, or Firm—James R. Hoatson, Jr.; Raymond H. Nelson; William H. Page, II

[57] ABSTRACT
Alpha olefins are separated from a mixture of internal and alpha olefins by treatment of said mixture with a thiophenolic compound to produce secondary and normal saturated sulfides followed by separation of the normal saturated sulfides and treatment to produce the desired alpha olefins.

11 Claims, 1 Drawing Figure

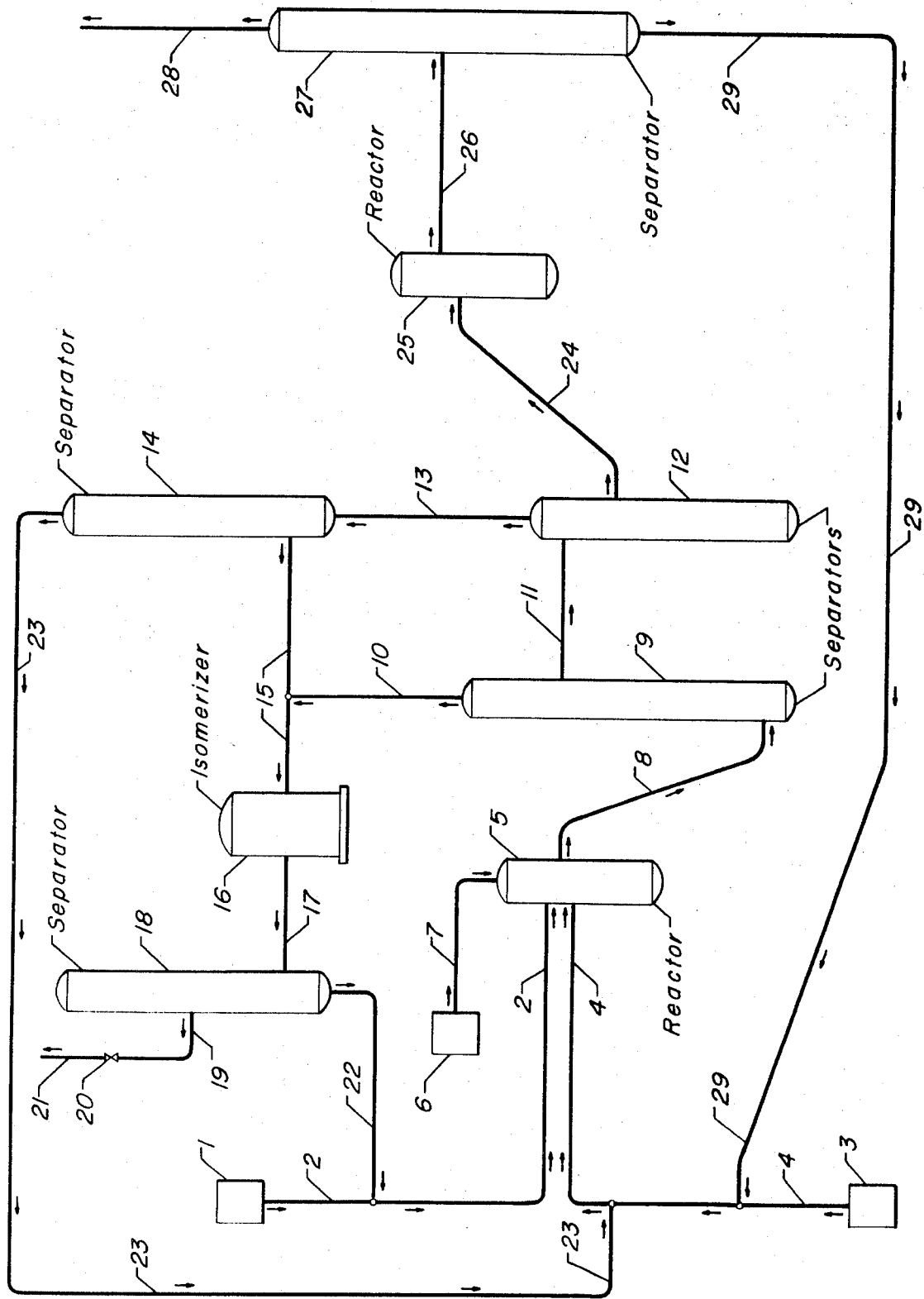

ALPHA OLEFIN SEPARATION PROCESS

This invention relates to a process for the separation of alpha olefins from a mixture of internal and alpha olefins. More specifically, this invention relates to a process for the separation of alpa olefins from a mixture of internal and alpha olefins which comprises treatment of said mixture with a thiophenolic compound to produce a mixture of secondary and normal saturated sulfides followed by subsequent treatment of the separated normal saturated sulfides to produce the desired alpha olefins.

The art of olefin separation is refined and well known. The obvious method, namely, fractional distillation, is extremely laborious and time consuming when an olefin is mixed with other materials having a relatively narrow boiling range. Other obvious methods would include various azeotropic distillation procedures and various solvent extraction procedures; however, these well known processes have not been so specific as to separate one olefin from another olefin, such as an alpha olefin from an internal olefin. It has been shown in the prior art that a disubstituted olefin having the structure of Structure I below,

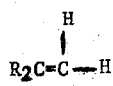

STRUCTURE I wherein R is a low molecular weight alkyl group such as ethyl or methyl, can be separated from other olefins by contact of an olefinic admixture with hydrogen sulfide in a vapor phase over an appropriate catalyst such as a sulfonic acid to form a tertiary mercaptan. The tertiary mercaptan may be separated from the mixture and subsequently decomposed to the disubstituted olefin as defined in structure I. It has also been shown in the prior art that an olefinic linkage may be prepared by converting mercaptans to compounds having a desired olefinic linkage by effecting a dehydrosulfurization of the mercaptan in the presence of a catalyst comprising an aluminosilicate. Furthermore, it has been shown in the prior art that mercaptans which may be subsequently separated to the desired olefinic linkage may be prepared by adding anhydrous iron chloride to an olefin mixture and thereby reacting said olefin with hydrogen sulfide by incrementally adding the solution of iron chloride and olefin to excess liquid hydrogen sulfide and cumene hydroperoxide.

In contradistinction to the prior art it has now been discovered that alpha olefins may be separated from a feedstock comprising alpha and internal olefin by a separation process which comprises contacting said feedstock with a thiophenolic compound in the presence of a catalyst comprising an organic peroxide to produce secondary and normal saturated sulfides, separating said secondary saturated sulfides from said normal saturated sulfides, contacting the normal saturated sulfides with a catalyst comprising an inorganic oxide to produce a thiophenolic compound and the desired alpha olefins, separating said thiophenolic compounds from said alpha olefins and recovering the resultant alpha olefins. The utilization of the above set forth invention will result in an overall decrease in the cost of the olefin separation as a consequence of the ability of the process to recycle thiophenolic compounds as hereinafter set forth in a preferred embodiment of the present invention. The utilization of the above set forth invention will also allow for a better control on the purity of the resultant alpha olefins because of greater combinations of various charge stocks which may be used as the starting materials. The present invention will also allow for the production of various alpha olefins from various internal olefins where, in a preferred embodiment of this invention, an isomerization unit may be utilized to form said alpha olefins which may be subsequently separated from all other internal olefins.

The desired products of the process of this invention, namely, alpha olefins are utilized in the chemical industry in many ways. For example, octene-1 may be utilized in organic synthesis; hexene-1 may be utilized in the synthesis of flavors, perfumes, medicines, dyes; heptene-1 may be utilized in the synthesis of flavors, perfumes, medicines, dyes; decene-1 may be utilized in pharmaceuticals, dyes, oils, resins; and tetradecene-1 may be used in perfumes, flavors, medicines, dyes, oils, resins, plastics, etc.

It is therefore an object of this invention to provide a process for the separation of alpha olefins.

A further object of this invention is to provide a separation process for the preparation of alpha olefins utilizing certain reaction and separation techniques which will permit the recovery of the desired alpha olefins in a more pecuniarily rewarding manner.

In one aspect an embodiment of this invention resides in a process for the separation of alpha olefins from a feedstock comprising alpha and internal olefins which comprises;(a) contacting said feedstock with a thiophenolic compound in the presence of a catalyst comprising an organic peroxide to produce secondary and normal saturated sulfides;(b) separating said secondary saturated sulfides from said normal saturated sulfides;(c) contacting the normal saturated sulfides with a catalyst comprising an inorganic oxide to produce a thiophenolic compound and the desired alpha olefins; d) separating said thiophenolic compounds from said alpha olefins and recovering the resultant alpha olefins.

A specific embodiment of this invention resides in a process for separating octene-1 from a mixture comprising octene-1, octene-2, octene-3 and octene-4 which comprises reacting the mixture with thiophenol in the presence of benzoyl peroxide to produce secondary and normal saturated octyl sulfides, separating said secondary saturated octyl sulfides from said normal saturated octyl sulfide, contacting the normal saturated octyl sulfide with a catalyst comprising activated alumina to produce thiophenol and octene-1, separating the thiophenol from the octene-1 by distillation and recovering the resultant octene-1.

A second specific embodiment of this invention resides in a process for separating octene-1 from a mixture comprising octene-1, nonene-2, heptene-3 and decene-4 which comprises reacting said mixture with thiophenol in the presence of benzoyl peroxide to produce secondary and normal saturated sulfides, separating said secondary saturated sulfides from said normal saturated sulfide, contacting the normal saturated sulfide with a catalyst comprising activated alumina to produce thiophenol and octene-1, separating said thiophenol from the octene-1 by distillation and recovering the resultant alpha olefin.

In a preferred embodiment of this invention it is contemplated that all alpha olefin species of the original internal olefinic species may be eventually separated where an isomerization unit is utilized in the recycle stream between the separation of the secondary olefins from thiophenolic compound and the charge stock line of the olefinic mixture. In the second specific embodiment given above in which internal olefins possessing different chain lengths are involved, it will be contemplated that nonene-1, heptene-1 and decene-1 will also be separated and recovered as well as octene-1 where the preferred isomerization unit is in operation.

In another preferred embodiment of the present invention it is contemplated that any thiophenolic compound which is recovered by the separation of the alpha olefin and the thiophenolic compound or from the separation of the secondary olefins and the thiophenolic compounds is recycled to the thiophenolic feed stream.

Any objects and embodiments will be found in the further detailed description of the present invention.

As hereinbefore set forth the present invention is concerned with a process for separating alpha olefins from a feedstock comprising alpha and internal olefins which comprises contacting said feedstock with a thiophenolic compound in the presence of a catalyst comprising an organic peroxide to produce secondary and normal saturated sulfides, separating said secondary saturated sulfides from said normal saturated sulfides, contacting the normal saturated sulfides with a catalyst comprising an inorganic oxide to produce a thiophenolic compound and the desired alpha olefins, separating the thiophenolic compounds from the alpha olefins and recovering the resultant alpha olefin. The separation process is effected under conditions include a temperature in the range of from about 50°C to about 15°C over the entire continuous system. In addition, another reaction condition involves pressures, said pressures ranging from about atmospheric up to 100 atmospheres or more over the entire continuous system, said pressure being determined mainly by economic considerations for the minimization of energy consumption. Another variable which is employed is the amount of reactants, the mixture of various olefins may be in any percentage proportion of alpha olefins to internal olefins, however, the percentage of alpha olefins in the mixture will control the selectivity of production between the secondary saturated sulfides and the normal saturated sulfides. The amount of reactants which may be employed in the reaction of the thiophenolic compound with the olefin mixture comprises from about 1 mol of olefin per mol of thiophenolic compound to one mol of olefin per 12 mols of thiophenolic compound.

Examples of suitable olefinic mixtures which may be utilized as one of the starting materials in the process of this invention would include, in particular, all olefinic mixtures wherein a quantity of alpha olefins is present such as a mixture of octene-1, octene-2, octene-3, octene-4; octene-1, nonene-2, heptene-3, decene-4; octene-1, nonene-1, heptene-3, hexene-2, octene-3; tridecene-1, dodecene-3, tetradecene-5, tetradecene-7, tetradecene-2; butene-1, pentane-2, hexene-1, heptene-2, octene-3; tetradecene-1, tetradecene-5, tetradecene-7, tetradecene-2; hexadecene-1, tetradecene-2, tridecene-3, dodecene-4; decene-1, nonene-1, octene-1, heptene-1, hexene-2; pentene-1, hexene-2; heptene-1, hexene-3; etc.

Suitable thiophenolic compounds which may be reacted with the aforementioned olefinic mixtures will include thiophenol, 2-thiohydroxyquinone, 3-thiocatechol, 2-thioresorcinol, 4-thiopyrogallol, 3-thiohydroxyquinone, 4-thiophloroglucinol, etc.

The catalytic composition of matter which is contemplated within the scope of this invention comprises different catalysts in different zones. A catalyst comprising an organic peroxide such as benzoyl peroxide is contemplated to be used in the first reaction zone wherein the olefinic mixture is reacted with the thiophenolic compound. Suitable examples of organic peroxides would include di-t-butyl peroxide, t-butyl perbenzoate, benzoyl peroxide, etc. It is also contemplated within the scope of this reaction that an inorganic oxide catalyst may be utilized in the second reaction zone and/or in the third separation zone. In the second reaction zone the thiophenolic compound and alpha olefin are derived from the normal saturated sulfide compound and in the third separation zone the thiophenolic compound and secondary olefins are derived from the secondary saturated sulfides. Suitable examples of inorganic oxides would include alumina, such as activated alumina, (commonly referred to as Aloca[H151]), silica, magnesia, thallia, zirconia, etc. In another preferred embodiment of this invention it is contemplated that any known isomerization catalyst such as alumina or an aluminosilicate such as mordenite or faujasite may be used in the isomerization zone which is located between the internal olefin stream derived from the separation of the secondary saturated sulfides in the third separation zone and the olefin feed stream to the first reactor. It is also contemplated within the scope of this invention that ethylene may be used to separate the normal saturated sulfides from the secondary saturated sulfides in the second separation zone or said separation may be accomplished by distillation. It is understood that the aforementioned olefinic mixtures, thiophenolic compounds, organic peroxides, inorganic oxides and isomerization catalysts are only representative of the class of compounds which may be employed, and that the present invention is not necessarily limited thereto.

The present invention will be further illustrated with reference to the accompanying drawing which illustrates a simplified flow diagram in which such details such as pumps, instruments and controls, heat exchange and heat recovery circuits, valving, start-up heaters, start-up lines and similar hardware have been omitted as being nonessential to the understanding of the techniques involved. The use of miscellaneous appurtenances to modify the process are well within the purview of one reasonably skilled in the art.

Referring now to the drawing, an olefinic mixture is charged to reactor unit 5 through line 2 from the olefinic mixture reservoir unit 1 and a thiophenolic compound is charged from the thiophenolic compound reservoir 3 to reactor unit 5 through line 4 in a mol ratio of from about 1 mol of olefinic mixture to about 12 mols of thiophenolic compound to form saturated secondary sulfides and normal saturated sulfides, said formation being effected in the presence of an organic peroxide catalyst which is charged to reactor unit 5 from the organic peroxide reservoir 6 through the passage of line 7. Reactor unit 5 is maintained at a temperature of from about 50°C to about 150°C and a pressure of from about 1 atmosphere to about 100 atmospheres. The saturated secondary sulfides and normal saturated sulfides are withdrawn from reactor unit 5 through line 8 and charged to separation unit 9, wherein any excess internal olefins are separated from the normal and secondary saturated sulfides by distillation and withdrawn from separation unit 9 through line 10. The separated internal olefins progress through line 10 to line 15, wherein they are mixed with other internal olefins which have been separated in separation unit 14 from the secondary saturated sulfides. The remaining normal saturated sulfides and secondary saturated sulfides are withdrawn from separation unit 9 through line 11 and charged to separation unit 12. The secondary saturated sulfides are separated from the normal saturated sulfides by distillation at predetermined temperatures or by the influx of ethylene, by means not known, in the separation unit 12. Secondary saturated sulfides are withdrawn through line 13 and charged to separation unit 14, where the secondary saturated sulfides are treated with an inorganic oxide catalyst to obtain internal olefins and thiophenolic compounds. The thiophenolic compounds obtained in separation unit 14 are withdrawn through line 23 and recycled to the thiophenolic feed stream of line 4. The internal olefins obtained in separation unit 14 are withdrawn from said unit through line 15 wherein they are mixed with other internal olefins recovered from separation unit 9 through line 10, said composite of internal olefins being charged to isomerization unit 16. The isomerization unit will contain any isomerization catalyst known to the art whereby the internal olefins are isomerized at least partially to alpha olefins. The olefinic mixture is then withdrawn from the isomerization unit 16 through line 17 and charged to separation unit 18, wherein, through control of predetermined temperatures, the alpha olefins and any olefins which may subsequently be isomerized to alpha olefins are separated and withdrawn from separation unit 18 through line 22 to the olefinic feed stream line 2. Any internal olefins which may not be isomerized to alpha olefins are withdrawn from separation unit 18 through lines 19 through valve 20 and captured at the end of line 21. The normal saturated sulfides are withdrawn from separation unit 12 through line 24 and charged to reactor unit 25, wherein the normal saturated sulfides are reacted over an inorganic oxide catalyst to produce thiophenolic compounds and alpha olefins. The thiophenolic compounds and alpha olefins are withdrawn from reactor unit 25 through line 26 and charged to separation unit 27. The physical conditions of separation unit 27 are held at predetermined levels so as to separate the alpha olefins which are withdrawn and recovered through line 28 and to withdraw the thiophenolic compound from separation unit 27 through line 29 and recycle the thiophenolic compound to the thiophenolic feed stream line 4.

The following examples are given to illustrate the process of the present invention which, however, are not intended to limit the generally broad scope of the invention in strict accordance therewith.

EXAMPLE I

In this example an olefinic charge stock comprising 27.8 weight percent octene-1 with octene-2, octene-3 and octene-4 comprising the remaining 72.2 weight percent and thiophenol were charged to a reaction zone containing a catalyst comprising benzoyl peroxide, said rate of thiophenol charge maintained so that 3.8 mols of thiophenol were charged to the reaction zone per 1.0 mol of the olefinic mixture. The reaction zone was maintained at a temperature of 80°C to 90°C and a pressure of one atmosphere. The products of the reaction zone are recovered and analyzed by means of infra-red spectroscopy, said analysis disclosed a 90 percent conversion of thiophenol, a 75 percent production of normal octyl phenyl sulfide and a 25 percent production of secondary octyl phenyl sulfide.

The normal octyl phenyl sulfide and the secondary octyl phenyl sulfide were easily separated by distillation in a separation unit and the recovered normal octyl phenyl sulfide was charged to a reactor zone containing a catalyst comprising activated alumina [commonly referred to as Alcoa(H151)]. The alpha olefin, octene-1, and thiophenol were formed by the catalytic treatment of the normal octyl phenyl sulfide and the products were recovered by a distillation of the products. The confirmation of the presence of the alpha olefin and the absence of any internal olefins was made by use of infra-red spectroscopy instrumentation.

EXAMPLE II

In this example an olefinic charge stock comprising 22.6 weight percent octene-1 with octene-2, octene-3 and octene-4 comprising the remaining 77.4 weight percent and thiophenol were charged to a reaction zone containing a catalyst comprising benzoyl peroxide, said rate of thiophenol charge maintained so that 4.5 mols of thiophenol were charged to the reaction zone per 1.0 mol of the olefinic mixture. The reaction zone was maintained at a temperature of 80°C to 90°C and a pressure of 1 atmosphere. The products of the reaction zone are recovered and analyzed by means of infra-red spectroscopy, said analysis disclosed a 91 percent conversion of thiophenol, a 72 percent production of normal octyl phenyl sulfide and a 28 percent production of secondary octyl phenyl sulfide.

The normal octyl phenyl sulfide and the secondary octyl phenyl sulfides were separated by distillation in a separation unit and the recovered normal octyl phenyl sulfide was charged to a reactor zone containing a catalyst comprising an activated alumina [commonly referred to as Alcoa(H151)]. The alpha olefin, octene-1, and thiophenol were formed by the catalytic treatment of the normal octyl phenyl sulfide and said products were recovered by a distillation of the products. The confirmation of the presence of the alpha olefin and the absence of any internal olefins was made by use of infra-red spectroscopy instrumentation.

EXAMPLE III

In this example an olefinic charge stock comprising 17.3 weight percent octene-1 with octene-2, octene-3 and octene-4 comprising the remaining 83.7 weight percent and thiophenol were charged to a reaction zone containing a catalyst comprising benzoyl peroxide, said rate of thiophenol charge was maintained so that 5.9 mols of thiophenol were charged to the reaction zone per 1.0 mol of the olefinic mixture. The reaction zone was maintained at a temperature of 80°C to 90°C and a pressure of 1 atmosphere. The products of the reaction zone are recovered and analyzed by means of infra-red spectroscopy, said analysis disclosed a 93 percent conversion of thiophenol, a 64 percent production of normal octyl phenyl sulfide and a 36 percent production of secondary octyl phenyl sulfide.

The normal octyl phenyl sulfide and the secondary octyl phenyl sulfide were separated by distillation in a separation unit and the recovered normal octyl phenyl sulfide was charged to a reactor zone containing a catalyst comprising activated alumina [commonly referred to as Alcoa(H151)]. The alpha olefin, octene-1, and the thiophenol were formed by the catalytic treatment of the normal octyl phenyl sulfide and said products were recovered by a distillation of the products. The confirmation of the presence of the alpha olefin and the absence of any internal olefins was made by use of infra-red spectroscopy instrumentation.

EXAMPLE IV

In this example a continuous process for the separation of alpha olefins from an olefinic mixture containing alpha and internal olefins is maintained as herein set forth. A stream of olefins comprising octene-1, nonene-2, heptene-3 and decene-4 are charged to a reaction zone containing di-t-butyl peroxide, said reaction zone being maintained at a temperature of 100°C and a pressure of 5 atmospheres as effected by the introduction of nitrogen. Thiophenol is charged to the reaction zone at a predetermined mol ratio with the olefinic mixture. The normal and secondary saturated phenyl sulfides formed from the reaction of the olefins with the thiophenol are withdrawn from the reactor and charged to a separation zone. Any excess internal olefins comprising nonene-2, heptene-3 or decene-4 are separated from the normal and secondary saturated phenyl sulfides and charged to an isomerization unit. The secondary and normal saturated phenyl sulfides are separated by the introduction of ethylene, said secondary saturated phenyl sulfides thereafter being charged to another separation zone containing an alumina catalyst. The secondary saturated phenyl sulfides are passed over the alumina to obtain thiophenol and internal olefins. The internal olefins are charged to an isomerization unit and the thiophenol is recycled to the thiophenol feed stream. The normal saturated phenyl sulfides are charged to a reactor containing a second alumina catalyst, where treatment of the normal saturated phenyl sulfides produces octene-1 and thiophenol. The thiophenol is recycled to the thiophenol feed stream while the desired octene-1, an alpha olefin, is recovered.

It is to be noted that when the isomerized recovered olefins are recycled to the olefin feed stream that all alpha olefins of the involved species will be recoverable. In this example eventually nonene-1, heptene-1 and decene-1 are recoverable.

EXAMPLE V

In this example a continuous process for the separation of alpha olefins from an olefinic mixture containing alpha and internal olefins is maintained as herein set forth. A stream of olefins comprising octene-1, nonene-1, heptene-3, hexene-2, octene-3, and nonene-4 are charged to a reaction zone containing benzoyl peroxide, said reaction zone being maintained at a temperature of 125°C and a pressure 100 atmospheres as effected by the introduction of helium. Thiophenol is charged to the reaction zone at a predetermined mol ratio with the olefinic mixture. The normal and secondary saturated phenyl sulfides are obtained from the reaction of the olefins with the thiophenol, said products are withdrawn from the reactor and charged to a separation zone. Any excess internal olefins comprising heptene-3, hexene-2, octene-3 or nonene-4 are separated from the normal and secondary saturated phenyl sulfides and charged to an isomerization unit. The secondary and normal saturated phenyl sulfides are separated by the introduction of ethylene, said secondary saturated phenyl sulfides thereafter being charged to a second separation zone containing an alumina catalyst. The secondary saturated phenyl sulfides are passed over the alumina to obtain thiophenol and internal olefins. The internal olefins are charged to an isomerization unit while the thiophenol is recycled to the thiophenol feed stream.

The normal saturated phenyl sulfides are charged to a reactor containing a second alumina catalyst, where treatment of the normal saturated phenyl sulfides produces octene-1, nonene-1 and thiophenol. The thiophenol is recycled to the thiophenol feed stream while the desired octene-1 and nonene-1, both alpha olefins, are recovered. It is to be noted that when the isomerized recovered olefins are recycled to the olefin feed stream that all alpha olefins of the involved species will be recovered. In this example eventually heptene-1 and hexene-1 are recovered.

EXAMPLE VI

In this example a continuous process for the separation of alpha olefins from an olefinic mixture containing alpha and internal olefins is maintained as herein set forth. A mixture of olefins comprising octene-1, octene-2, octene-3, and octene-4 are charged to a reaction zone containing benzoyl peroxide, said reaction zone being maintained at a temperature of 100°C and a pressure of 1 atmosphere, simultaneously, 2-thiohydroquinone is charged to the reaction zone at a predetermined mol ratio with the olefinic mixture. The normal and secondary saturated phenyl sulfides obtained from the reaction of the olefins with the 2-thiohydroquinone are withdrawn from the reactor and charged to a separation zone. Any excess internal olefins comprising octene-2, octene-3, or octene-4 are separated from the normal and secondary saturated phenyl sulfides and charged to an isomerization unit. The secondary and normal saturated phenyl sulfides are separated by distillation in a second separation zone, said secondary saturated phenyl sulfides thereafter being charged to another separation zone containing a silica catalyst. The secondary saturated phenyl sulfides are passed over the silica catalyst to form 2-thiohydroquinone and internal olefins. The internal olefins are charged to an isomerization unit while the 2-thiohydroquinone is recycled to the 2-thiohydroquinone feed stream. The normal saturated phenyl sulfides are charged to a reactor containing an alumina catalyst, where treatment of the normal saturated phenyl sulfides produces octene-1 and 2-thiohydroquinone. The 2-thiohydroquinone is recycled to the 2-thiohydroquinone feed stream while the desired octene-1, alpha olefin, is recovered.

It is to be noted that when the isomerized recovered olefins are recycled to olefin feed stream that all alpha olefins of the involved species are recovered, namely, octene-1.

EXAMPLE VII

In this example a continuous process for the separation of alpha olefins from an olefinic mixture containing alpha and internal olefins is maintained as herein set forth. A stream of olefins comprising tridecene-1, dodecene-3, tetradecene-5, and tetradecene-7 are charged to a reaction zone containing di-t-butyl peroxide, said reaction zone being maintained at a temperature of 75°C and a pressure of 1 atmosphere. Thiophenol is charged to the reaction zone at a predetermined mol ratio with the olefinic mixture. The normal and secondary saturated phenyl sulfides obtained from the reaction of the olefins with the thiophenol are withdrawn from the reactor and charged to a separation zone. Any excess internal olefins comprising dodecene-3, tetradecene-5 and tetradecene-7 are separated from the normal and secondary saturated phenyl sulfides and charged to an isomerization unit. The secondary and normal saturated phenyl sulfides are separated by distillation in a second separation zone, said secondary saturated phenyl sulfides thereafter being charged to a third separation zone containing a magnesia catalyst. The secondary saturated phenyl sulfides are passed over the catalyst to obtain thiophenol and internal olefins. The internal olefins are charged to an isomerization unit while the thiophenol is recycled to the thiophenol feed stream. The normal saturated phenyl sulfides are charged to a reactor containing a silica catalyst, where catalytic treatment of the normal saturated phenyl sulfides produces tridecene-1 and thiophenol. The thiophenol is recycled to the thiophenol feed stream while the desired tridecene-1, an alpha olefin is recovered.

It is to be noted that when the isomerized recovered olefins are recycled to the olefin feed stream that all alpha olefins of the involved species will be recovered. In this example eventually dodecene-1 and tetradecene-1 are recovered.

I claim as my invention:

1. A process for the separation of alpha olefins from a feedstock comprising alpha and internal olefins at a temperature of from about 50°C to about 150°C and a pressure of from about 1 atmosphere to about 100 atmospheres which comprises:
   a. contacting said feedstock with a thiophenolic compound in the presence of a catalyst comprising an organic peroxide material selected from the group consisting of di-t-butyl peroxide, t-butyl perbenzoate and benzoyl peroxide to produce secondary and normal saturated sulfides;
   b. separating said secondary saturated sulfides from said normal saturated sulfides;
   c. contacting the normal saturated sulfides with a catalyst comprising a material selected from the group consisting of alumina, activated alumina, silica magnesia, thallia and zirconia compound to produce a thiophenolic compound and the desired alpha olefins;
   d. separating said thiophenolic compounds from said alpha olefins and recovering the resultant alpha olefins.

2. The process of claim 1 further characterized in that the secondary saturated sulfides are separated to obtain internal olefins and thiophenolic compounds by treatment of said secondary saturated sulfides with a catalyst comprising a material selected from the group consisting of alumina or an aluminosilicate, mordenite, and faujasite compound.

3. The process of claim 2 further characterized in that the internal olefins are isomerized, said isomerization comprising the passage of said internal olefins over a catalyst comprising a material selected from the group consisting of alumina or an aluminosilicate, mordenite, and faujasite compound.

4. The process of claim 3 further characterized in that the olefins isomerized to an alpha olefin are recycled to the olefin feedstock stream.

5. The process of claim 1 further characterized in that the thiophenolic compound recovered from the separation of the alpha olefins and the thiophenolic compound is recycled to the thiophenolic feed stream.

6. The process of claim 2 further characterized in that the thiophenolic compound recovered from the separation of internal olefins and the thiophenolic compounds is recycled to the thiophenolic feed stream.

7. The process of claim 1 further characterized in that the thiophenolic compound is thiophenol, the feedstock comprising alpha and internal olefins is a mixture of octene-1, octene-2, octene-3 and octene-4 and the resultant alpha olefin is octene-1.

8. The process of claim 1 further characterized in that the thiophenolic compound is thiophenol, the feedstock comprising alpha and internal olefins is a mixture of octene-1, nonene-2, heptene-3 and decene-4 and the resultant alpha olefin is octene-1.

9. The process of claim 1 further characterized in that the thiophenolic compound is thiophenol, the feedstock comprising alpha and internal olefins is a mixture of octene-1, nonene-1, heptene-3, hexene-2, octene-3 and nonene-4 and the resultant alpha olefin are a mixture of octene-1 and nonene-1.

10. The process of claim 1 further characterized in that the thiophenolic compound is 2-thiohydroquinone, the feedstock comprising alpha and internal olefins is a mixture of octene-1, octene-2, octene-3 and octene-4, and the resultant alpha olefin is octene-1.

11. The process of claim 1 further characterized in that the thiophenolic compound is thiophenol, the feedstock comprising alpha and internal olefins is a mixture of tridecene-1, dodecene-3, tetradecene-5, and tetradecene-7 and the resultant alpha olefin is tridecene-1.

* * * * *

UNITED STATES PATENT OFFICE
CERTIFICATE OF CORRECTION

Patent No. 3,864,420          Dated February 4, 1975

Inventor(s) Robert A. Dombro

It is certified that error appears in the above-identified patent and that said Letters Patent are hereby corrected as shown below:

In the heading [21], correct the Application Number from "466,387" to -- 466,367 --.

Signed and sealed this 1st day of July 1975.

(SEAL)
Attest:

RUTH C. MASON
Attesting Officer

C. MARSHALL DANN
Commissioner of Patents
and Trademarks